No. 673,292. Patented Apr. 30, 1901.
H. H. SATER.
SULKY PLOW.
(Application filed Feb. 18, 1901.)
(No Model.) 2 Sheets—Sheet 1.
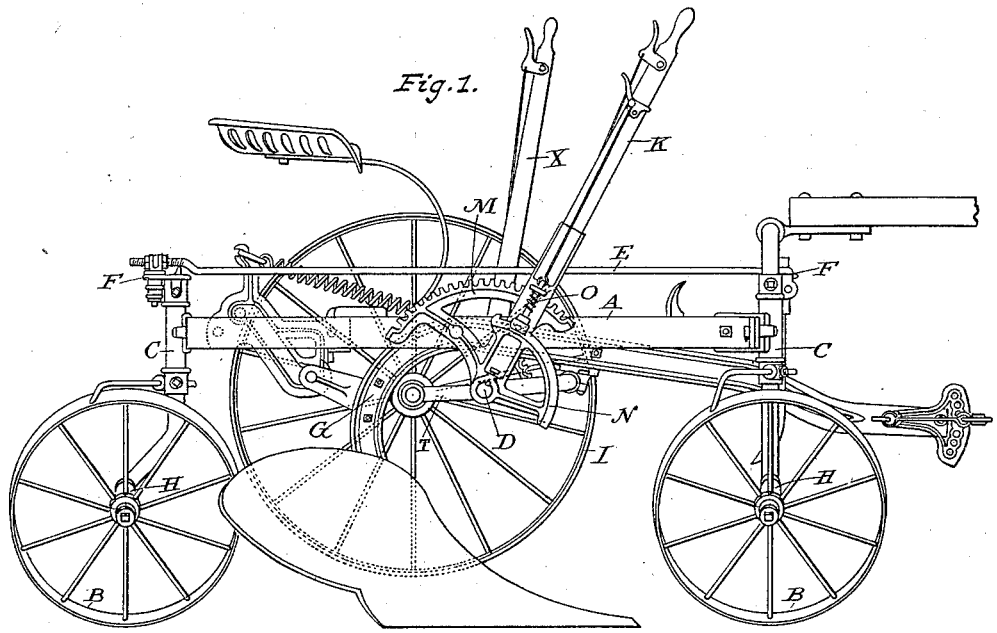
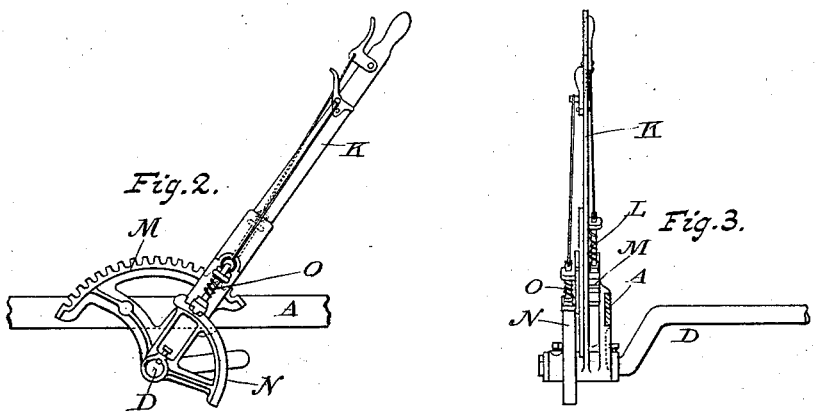
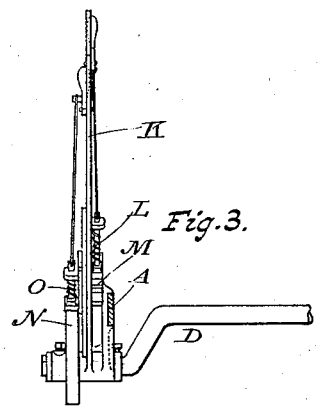
Witnesses,
Hans H. Sater,
Inventor,
Attorney.

No. 673,292. Patented Apr. 30, 1901.
H. H. SATER.
SULKY PLOW.
(Application filed Feb. 18, 1901.)

(No Model.) 2 Sheets—Sheet 2.

Witnesses,

Hans H. Sater,
Inventor, by
Attorney

THE NORRIS PETERS CO., PHOTO-LITHO., WASHINGTON, D. C.

UNITED STATES PATENT OFFICE.

HANS H. SATER, OF JANESVILLE, WISCONSIN, ASSIGNOR TO JANESVILLE MACHINE COMPANY, OF SAME PLACE.

SULKY-PLOW.

SPECIFICATION forming part of Letters Patent No. 673,292, dated April 30, 1901.

Application filed February 18, 1901. Serial No. 47,860. (No model.)

*To all whom it may concern:*

Be it known that I, HANS H. SATER, a citizen of the United States, residing at Janesville, in the county of Rock and State of Wisconsin, have invented certain new and useful Improvements in Sulky-Plows; and I do hereby declare the following to be a full, clear, and exact description of the invention, such as will enable others skilled in the art to which it appertains to make and use the same.

My invention has for its object to provide means whereby a plow mounted upon a carrying-frame may, if desired, be held rigidly in position or be raised automatically, so as to pass over and clear an obstacle in its path and be readily adjusted again into working position. This I accomplish by the means illustrated in the accompanying drawings, in which a plow-beam is mounted upon a crank-axle which may be adapted to rotate automatically, if desired, while the plow is in operation, and thereby permit said plow to pass over an obstacle and be brought into working position again by means of a lever mounted freely upon said axle and adapted to be adjusted rigidly on said axle at will and adapted also to be adjustably secured to the main frame of the plow when said lever is loosely mounted upon said axle or rigidly adjusted thereto.

My invention is shown as applied to a sulky-plow similar in general construction to that shown and described in Letters Patent granted to me June 1, 1898, No. 606,032.

Figure 4:
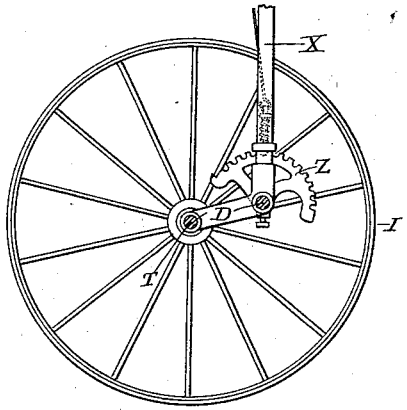
Figure 5:
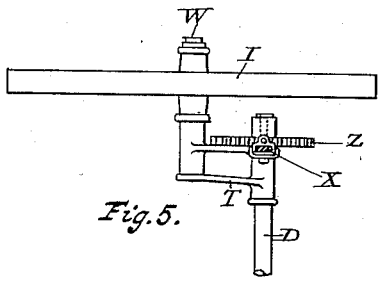
Figure 6:
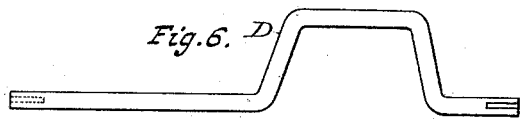
Figure 7:
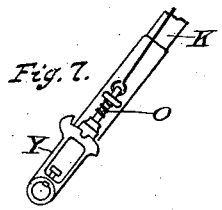

In the drawings, Figure 1 represents a side elevation of a sulky-plow embodying my invention. Fig. 2 represents a side elevation of a controlling-lever mounted upon a crank-axle and locking mechanism connected therewith. Fig. 3 represents a front elevation of the parts shown in Fig. 2. Fig. 4 represents a side elevation of a land-wheel mounted upon a crank-arm journaled upon an axle. Fig. 5 represents a plan elevation of the parts shown in Fig. 4. Fig. 6 represents a crank-axle. Fig. 7 represents a side elevation of a modification of means for securing a controlling-lever to a crank-axle.

As illustrated in the drawings, A represents a main frame supported upon furrow-wheels B, which furrow-wheels are journaled upon axles H, formed on standards C, which standards are provided on their upper ends with laterally-extending arms F, connected together by means of a longitudinal rod E. The plow-beam G is mounted upon a crank-axle D, which is journaled at one end on the main frame A and at its opposite end on the land-wheel I. A lever K is loosely mounted upon one end of the axle D and provided with a spring-latch L, which engages a notched sector M, attached to the main frame A. The outer end of the axle D is provided with a sector N or equivalent device rigidly secured to said axle, which is adapted to engage a spring-latch O, connected with the lever K. By means of such construction the lever K may be rigidly secured to the crank-axle D, and the plow-beam G may then be raised or lowered by means of the lever K, operating the crank-shaft D, upon which the plow-beam is mounted. When the plow is at the desired elevation, it may be locked rigidly in position by means of the spring-latch L, engaging the notched sector M, attached to the main frame. When, however, the plow is operating in stony ground and it is desired to permit the plow-point to rise over an obstacle in its path, the spring-latch O is maintained released from engagement with the sector N by raising the handle of said latch until the pivotal connection between said handle and the latch-rod is raised above the point of attachment of said handle to the lever K. When said latch is so released, the crank-axle D is free to rotate automatically, and when the plow-point strikes an obstacle it is raised upward with the crank of said axle, so that the plow-point is free to pass over said obstacle. After such obstacle has been passed the lever K is drawn backward until the latch comes again in contact with the notch of the sector N, which has been drawn backward by the upward movement of the crank of the axle, and the latch O is again permitted to engage said sector N, and thereby connect said lever K rigidly to said axle D. Said lever K is then moved forward, so as to depress the crank of the axle and lower the plow-point to the desired working position. The plow may then be held rigidly in such position by leaving the spring-latch O in engagement with the sector N, or the spring-latch O may be again released and the crank-axle permitted to rotate freely, so as to enable said plow-point to again rise up and pass over an obstacle.

The land-wheel I is supported on a crank-arm T, which arm is journaled on the outer end of the axle D, and the outer end of said axle is provided with a notched sector Z, rigidly secured thereto. A lever X is connected with said crank-arm T, by means of which said axle D may be raised or lowered relatively to the horizontal plane of the shaft W, upon which the land-wheel I is mounted, and when at the desired elevation it may be secured in position by means of a spring-latch secured to said lever X, engaging said sector Z.

I do not desire to be limited to the specific construction of the means shown for securing the lever K rigidly to the axle D when desired, but I desire to include, broadly, other constructions having similar capabilities. Thus instead of the notched sector N an arm Y may be rigidly connected with the axle D and provided with a notch adapted to engage the spring-latch O. I desire to include, broadly, a plow-beam mounted upon a crank-shaft, which is adapted to rotate freely automatically when desired, so as to raise said plow-beam, or be locked rigidly in position by means of a lever mounted upon said axle and adapted to be rigidly secured to said axle or rotated independently thereof.

What I claim as new, and desire to secure by Letters Patent, is—

1. In a sulky-plow, the combination with a main frame, of a plow-beam and plow, a crank-axle adapted to rotate freely while the plow is in operation, and a lever mounted upon said axle and adapted to be rigidly connected therewith or to be rotated independently of said axle, and to be adjustably secured to said main frame, substantially as shown and described.

2. In a sulky-plow, the combination with a main frame, of a crank-axle, a plow-beam supported upon said axle, a lever loosely mounted upon said axle and adapted to be adjustably secured to said main frame and provided with locking mechanism adapted to secure said lever rigidly to said axle, substantially as shown and described.

3. In a sulky-plow, the combination with a main frame, of a crank-axle, a plow-beam mounted upon said axle, a lever journaled upon said axle and provided with locking mechanism adapted to adjustably secure said lever to said main frame or to said axle independently of each other, or connectedly therewith, substantially as shown and described.

In testimony whereof I affix my signature in presence of two witnesses.

HANS H. SATER.

Witnesses:
F. H. FARNSWORTH,
SAMUEL C. COBB.